Figure 1:
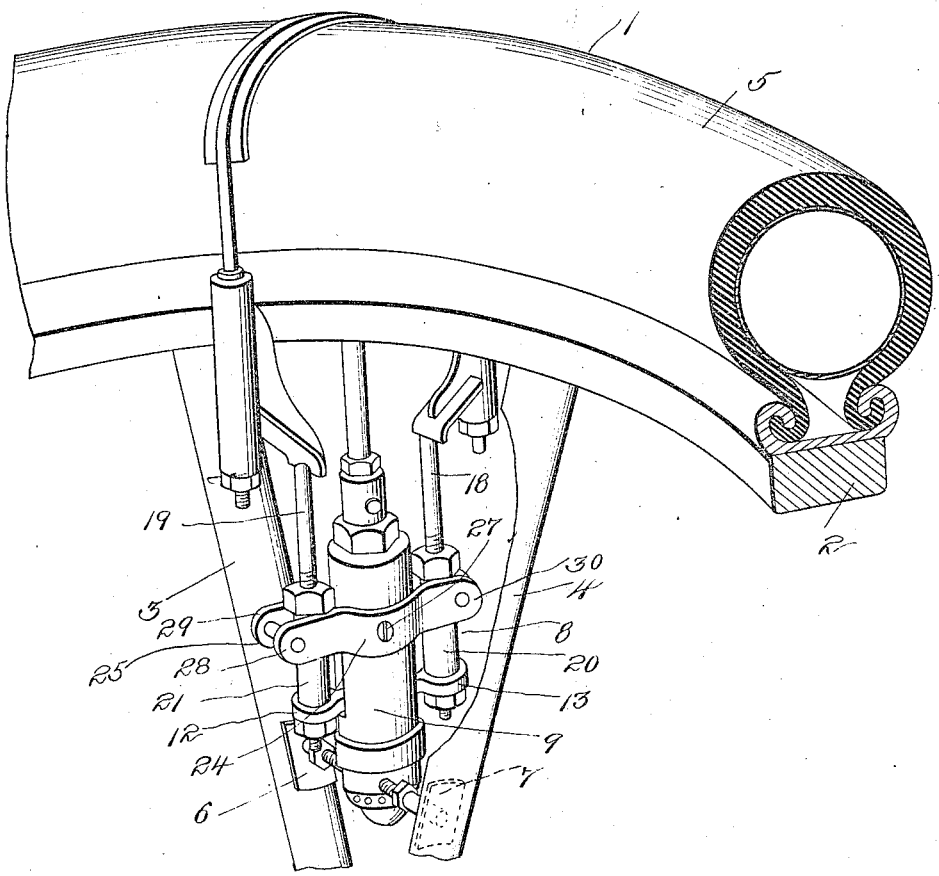

G. E. R. ROTHENBUCHER.
DEVICE FOR AUTOMATICALLY INFLATING AUTOMOBILE TIRES.
APPLICATION FILED JUNE 30, 1915.

1,200,874.

Patented Oct. 10, 1916.
2 SHEETS—SHEET 1.

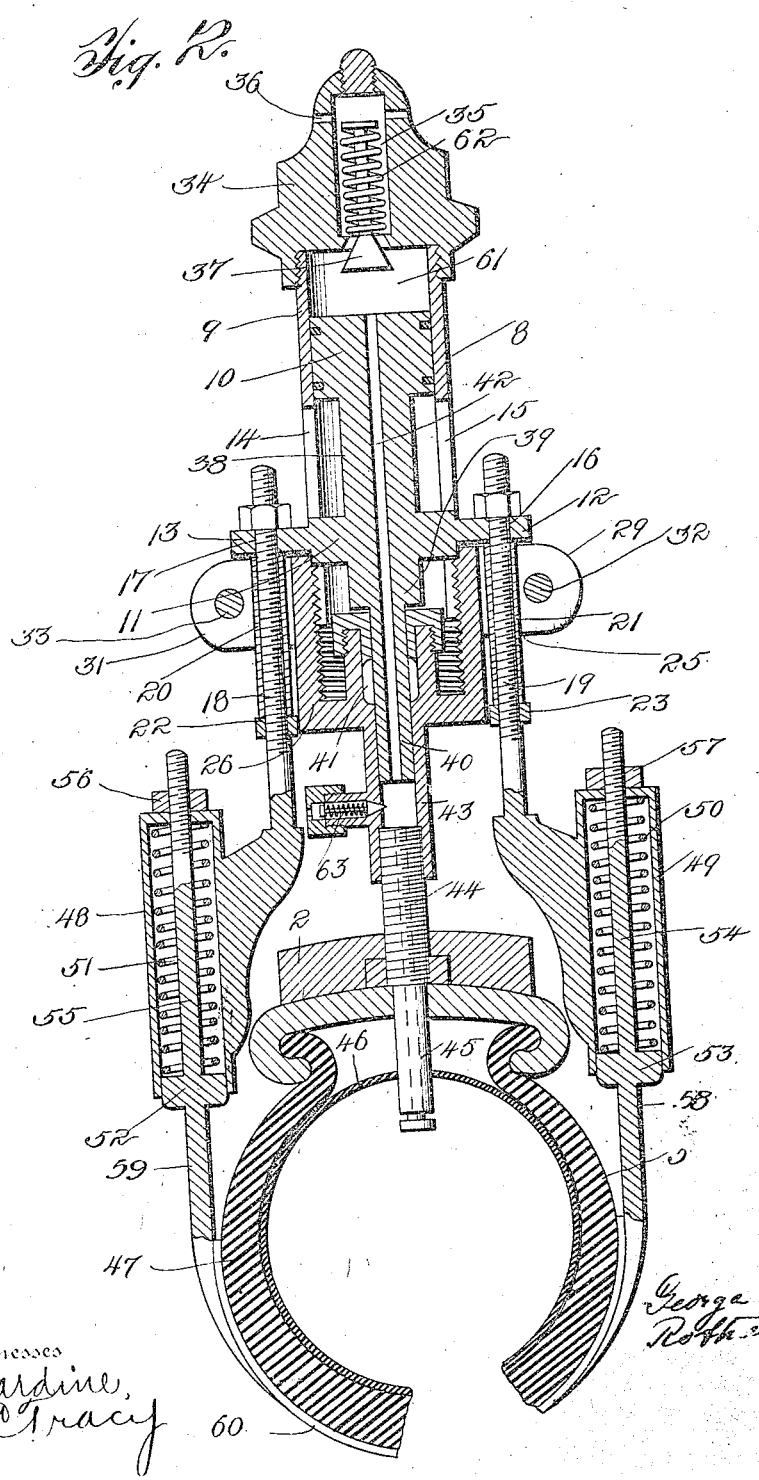

UNITED STATES PATENT OFFICE.

GEORGE E. R. ROTHENBUCHER, OF NEW YORK, N. Y.

DEVICE FOR AUTOMATICALLY INFLATING AUTOMOBILE-TIRES.

1,200,874.  Specification of Letters Patent.  Patented Oct. 10, 1916.

Application filed June 30, 1915. Serial No. 37,232.

*To all whom it may concern:*

Be it known that I, GEORGE E. R. ROTH-ENBUCHER, a citizen of the United States, residing at New York city, in the county of New York and State of New York, have invented certain new and useful Improvements in Devices for Automatically Inflating Automobile-Tires, of which the following is a specification.

This invention relates to a device for automatically inflating automobile tires and has for its object to provide means for inflating a tire while in motion.

Another object of the invention is to provide means attachable to and operable by a tire for inflating the same.

Still another object of the invention is to provide a tire inflating pump attachable to a vehicle wheel and operable by the action of the tire.

With the above and other similar objects in view which will later be more fully explained, I have invented the device illustrated in the accompanying drawings in which:—

Figure 1, is a perspective view of a portion of a vehicle wheel showing my tire inflating pump in connection therewith and Fig. 2, is an enlarged vertical sectional view of the pump shown in connection with a tire.

Like reference characters indicate like parts throughout the specification and in the several views in the drawings in which 1 indicates a wheel having a rim 2 spokes 3 and 4 and a tire 5. Clamped to the spokes 3 and 4 by means of the screw controlled members 6 and 7 is a pump 8, which consists of a cylinder 9 having a piston 10 operating therein. This piston is provided with a cross head 11 the arms 12 and 13 of which project through elongated parallel slots 14 and 15 in said cylinder. These arms are provided with openings 16 and 17 through which the bolts 18 and 19 pass. Collars 20 and 21 are mounted on said bolts which are held against the arms 12 and 13 by means of nuts 22 and 23. Straps 24 and 25 are fixed to the cylinder head 26 by screws 27, the ends 28 and 29, 30 and 31, of said straps being held fixedly spaced apart by bolts 32 and 33. Said bolts 18 and 19 and collars 20 and 21 being freely movable between said strap arms. The cylinder 9 is provided with a head 34 having an opening 35 passing therethrough and ports 36 leading to said opening and spring controlled suction valve 37 is mounted in the cylinder end of said head 34. In order to reduce friction the body portion 38 of said piston 10 is reduced in diameter and end 39 is provided with a still further reduced portion 40 which operates through the stuffing box 41. A bore 42 extends entirely through the piston 10 its body portion 38 and its extension 40. A tubular extension 43 is provided on the head 26 which is screw threaded to the air valve tube 44 the lower end 45 of which extends into the inner tube 46 of the tire 47.

Connected to the members 18 and 19 are cylinders 48 and 49 in which are carried springs 50 and 51 which are held therein by the flanges 52 and 53 on the rods 54 and 55 which extend longitudinally through said cylinders 48 and 49, the ends of said members 54 and 55 being screw threaded to receive the nuts 56 and 57 whereby said members 54 and 55 are held in place. The rigid ends 58 and 59 of said members 54 and 55 are integrally connected by a band 60 which passes around the tire 47.

The flanges 52 and 53 act as pistons in the cylinders 48 and 49 whereby a sufficiently rigid connection between the members 54 and 55 and the members 48 and 49 is had in order to drive the piston 10 toward the cylinder head 34 when the member 60 is forced upwardly by coming in contact with the surface upon which the wheel 1 is rotating. When the piston head 10 is forced up air in the chamber 61 is forced through the bore 42, tubes 43 and 45 and into the tire tube 46. When the piston 10 is drawn away from the cylinder head 34 the suction created operates the valve 37 against its spring 62 thereby drawing a fresh supply of air into the chamber 61. This operation continues until the amount of compressed air in the tire is sufficient to prevent further action of the members 54, 55, and 60 which will begin to operate the pump 8 only after the tire starts to become slack. In order to prevent over inflation of the tire a safety valve 63 is connected with the tube 43.

Having now described my invention that which I claim to be new and desire to procure by Letters Patent is:—

1. The combination of a tire and an inflating pump connected directly thereto, a band around said tire for operating said pump, rigid arms connecting said band and pump and resilient connections between said band and arms.

2. The combination of a tire and an inflating pump connected directly thereto, a band around said tire for operating said pump, rigid arms connecting said band and pump and resilient connections between said band and arms, said band ends terminating in piston rods whereby said connection is formed.

3. The combination of a tire and an inflating pump connected directly thereto, a band around said tire for operating said pump, rigid arms connecting said band and pump and resilient connections between said band and arms, said band ends terminating in piston rods whereby said connection is formed and cylinders through which said rods project and flanges on said rods operating in said cylinders.

4. The combination of a tire and an inflating pump connected directly thereto, a band around said tire for operating said pump, rigid arms connecting said band and pump and resilient connections between said band and arms, said band ends terminating in piston rods whereby said connection is formed and cylinders through which said rods project and flanges on said rods operating in said cylinders, and coil springs in said cylinders seating against said flanges for providing resilience for said connection.

5. The combination of a tire and a pump for inflating the same, said pump consisting of a cylinder, a piston member therein, arms on said member and reciprocating rods connecting said tire and arms, said rods being adjustably connected to said arms, said member being hollow to permit air to pass therethrough to said tire, and a tube extending into said tire, said cylinder having a reduced extension forming a coupling between said tube and said member.

6. In combination with a wheel, a pump embracing a piston with arms, said pump having connections with the tire of said wheel, means for operating said pump to automatically inflate said tire, said means consisting of a pair of rods rigidly connected to said arms and a band passing around said tire whereby said rods are operated, and resilient connections between said band and rods, said rods having cylinders connected thereto, said band having members operating through said cylinders whereby said connections are formed, pistons on said members operating in said cylinders, said pistons adapted to compress air in said cylinders whereby said members may operate said rods.

7. The described device consisting of a wheel and a pump connected with the tire thereof, said pump consisting of a cylinder and a piston, said piston having an air passage therethrough terminating in the interior of said tire, said cylinder having a compression chamber at its outer end whereby air is forced through said piston and into said tire, said cylinder having parallel openings centrally thereof, and said piston having arms projecting through said openings whereby the piston may be reciprocated.

8. The described device consisting of a wheel and a pump connected with the tire thereof, said pump consisting of a cylinder and a piston, said piston having an air passage therethrough terminating in the interior of said tire, said cylinder having a compression chamber at its outer end whereby air is forced through said piston and into said tire, said cylinder having parallel openings centrally thereof, and said piston having arms projecting through said openings whereby the piston may be reciprocated, and means for operating said arms.

9. The described device consisting of a wheel and a pump connected with the tire thereof, said pump consisting of a cylinder and a piston, said piston having an air passage therethrough terminating in the interior of said tire, said cylinder having a compression chamber at its outer end whereby air is forced through said piston and into said tire, said cylinder having parallel openings centrally thereof, and said piston having arms projecting through said openings whereby the piston may be reciprocated, and means for operating said arms, said means embracing a band passing around said tire.

In testimony whereof I affix my signature in the presence of two witnesses.

GEORGE E. R. ROTHENBUCHER.

Witnesses:
 GEO. R. HALL,
 EMIL TAGGERELL.